United States Patent [19]

Goates

[11] Patent Number: 5,234,389
[45] Date of Patent: Aug. 10, 1993

[54] RELEASABLE OVERRUNNING COUPLING POWER TRANSMISSION MECHANISM ACTING IN COOPERATION WITH A FRICTION BRAKE

[75] Inventor: Eldon L. Goates, Westland, Mich.

[73] Assignee: Ford Motor Company, Dearborn, Mich.

[21] Appl. No.: 856,424

[22] Filed: Mar. 23, 1992

[51] Int. Cl.[5] .......................... F16H 57/10; F16H 1/28; F16D 15/00; F16D 23/12
[52] U.S. Cl. .................................... 475/297; 188/82.3; 188/82.84; 192/12 B; 192/35; 192/45; 475/312; 475/318; 475/324
[58] Field of Search .......................... 188/82.3, 82.84; 192/12 B, 35, 45; 475/297, 312, 318, 324, 293

[56] References Cited

U.S. PATENT DOCUMENTS

| | | | |
|---|---|---|---|
| 2,552,000 | 5/1951 | Dubois | 475/297 |
| 2,664,183 | 12/1953 | Payne | 192/45 |
| 2,683,997 | 7/1954 | Föster | 475/312 |
| 2,747,433 | 5/1956 | Förster | 475/312 X |
| 2,970,489 | 2/1961 | Eason | 74/120 |
| 3,014,567 | 12/1961 | Stockton | 192/45 |
| 3,209,620 | 10/1965 | Moan | 475/312 X |
| 3,233,478 | 2/1966 | General et al. | 188/82.3 X |
| 3,279,571 | 10/1966 | Wassilieff | 192/38 |
| 3,354,752 | 11/1967 | General et al. | 188/82.3 X |
| 3,388,779 | 6/1968 | Roper | 192/44 |
| 3,476,226 | 11/1969 | Massey | 192/27 |
| 3,631,741 | 1/1972 | Kelbel | 192/12 B X |
| 3,750,782 | 8/1973 | Costantini et al. | 192/45 |
| 3,823,625 | 7/1974 | Myers | 81/59.1 |
| 3,882,814 | 5/1975 | Shimanckas | 115/34 |
| 3,990,555 | 11/1976 | Carullo | 192/45 |
| 4,076,108 | 2/1978 | Fogelberg | 192/35 |
| 4,083,419 | 4/1978 | Fogelberg | 180/44 |
| 4,114,478 | 9/1978 | Klaus | 475/312 X |
| 4,123,952 | 11/1978 | Wayman | 475/312 X |
| 4,124,085 | 11/1978 | Fogelberg | 180/49 |
| 4,223,572 | 9/1980 | Weiertz et al. | 192/12 B X |
| 4,434,878 | 3/1984 | Okubo | 192/48.92 |
| 4,455,890 | 6/1984 | Kuramochi et al. | 475/312 X |
| 4,509,389 | 4/1985 | Vahratian et al. | 475/66 |
| 4,624,154 | 11/1986 | Kraft et al. | 475/71 X |
| 4,852,707 | 8/1989 | Ito et al. | 192/44 |
| 4,881,624 | 11/1989 | Ulmann | 188/82.3 X |
| 4,901,831 | 2/1990 | Ito et al. | 192/38 |
| 4,966,265 | 10/1990 | Wiese et al. | 192/35 |
| 4,978,328 | 12/1990 | Pierce | 475/66 |
| 4,987,790 | 1/1991 | Weismann | 74/333 |
| 5,031,746 | 7/1991 | Koivunen | 192/85 |
| 5,088,354 | 2/1992 | Asada | 475/281 X |
| 5,097,726 | 3/1992 | Asada | 364/424.1 X |
| 5,120,284 | 6/1992 | Asada | 475/278 |

FOREIGN PATENT DOCUMENTS

| | | |
|---|---|---|
| 538959 | 4/1957 | Canada . |
| 1072044 | 12/1959 | Fed. Rep. of Germany . |
| 2317208 | 10/1974 | Fed. Rep. of Germany . |
| 57-79334 | 5/1982 | Japan . |
| 59-205031 | 11/1984 | Japan . |

Primary Examiner—Leslie A. Braun
Assistant Examiner—David E. Henn
Attorney, Agent, or Firm—Roger L. May; Frank G. McKenzie

[57] ABSTRACT

A multi-directional planetary transmission mechanism adapted to establish plural torque flow paths between a driving member and a driven member including a one-way torque delivery clutch located in the torque flow path from the torque input element of the planetary gear system and a torque output shaft, and a friction brake means for anchoring the torque input element of the planetary gearing to establish a change in torque ratio wherein provision is made for disengaging the one-way clutch to interrupt torque delivery therethrough in either a driving direction or a coast direction and simultaneously anchoring said torque input element of said gearing to provide a torque reaction point.

8 Claims, 7 Drawing Sheets

Prior Art

FIG. 1.

| Gear | Cl 1 | Cl 2 | Cl 3 | Cl 4 | B1 | B2 | Drive | | Coast | | Ratio |
|------|------|------|------|------|----|----|-------|-------|-------|-------|-------|
|      |      |      |      |      |    |    | OWC 1 | OWC 2 | OWC 1 | OWC 2 |       |
| 1M   | X    |      | X    |      |    | X  | X     |       |       | X     | 2.771 |
| 1D   | X    |      |      |      |    | X  | X     |       | O/R   |       | 2.771 |
| 2    | X    | X    |      |      |    | X  | O/R   |       | O/R   |       | 1.543 |
| 3    | X    | X    | X    |      |    |    |       | X     | X     |       | 1.000 |
| 4    |      | X    | X    |      | X  |    |       | O/R   |       | O/R   | .694  |
| R    | X    |      |      | X    |    | X  |       |       |       |       | -2.263|

Prior Art

RELEASABLE OVERRUNNING COUPLING POWER TRANSMISSION MECHANISM ACTING IN COOPERATION WITH A FRICTION BRAKE

TECHNICAL FIELD

My invention relates to automatic transmissions for automotive vehicles and to improvements in transmission clutches and brakes.

BACKGROUND OF THE INVENTION

My invention comprises improvements in a multiple-ratio, automotive vehicle transmission of the kind disclosed in U.S. Pat. No. 4,978,328, which is assigned to the assignee of my invention. That transmission comprises a pair of planetary gear units mounted on an output shaft axis and a hydrokinetic torque converter mounted on the axis of the crankshaft of an internal combustion engine arranged in parallel disposition with respect to the output shaft axis. The turbine of the torque converter is connected to torque input clutches by means of a torque transfer drive between the engine crankshaft axis and the output shaft axis.

The clutches that control the torque flow paths in the planetary gear units during operation in each of four forward driving ratios include a pair of overrunning clutches located between the torque input shaft and torque input elements of the planetary gearing. One overrunning clutch is adapted for torque delivery in one direction, and the other overrunning clutch is adapted for torque delivery in the opposite direction. Each of the overrunning clutches includes an outer race that is adapted to be connected to the torque input elements of the gearing associated with that clutch through a selectively engageable friction clutch.

One of the overrunning clutches is adapted for torque delivery in a forward driving direction when the planetary gearing is conditioned for operation in each of the first two forward driving speed ratios. The other overrunning clutch is adapted for torque delivery during operation in a third forward driving direction. On a ratio shift from the third speed ratio to the fourth speed ratio, which is an overdrive ratio, it is necessary to disengage the friction clutch associated with the first overrunning clutch and to synchronously engage a brake for a reaction gear element of the planetary gearing.

This clutch and brake arrangement makes it necessary to provide two friction members as well as two overrunning clutches for controlling ratio changes between the fourth ratio and the third ratio. Each friction member requires added space in an environment in which space availability is a premium.

The need for two friction members (i.e., the friction clutch and the friction brake) associated with the first overrunning clutch complicates the design and makes it necessary to use synchronous control elements to effect engagement and release of the clutches and brakes in timed relationship during a ratio change between the fourth ratio and the third ratio.

GENERAL DESCRIPTION OF THE IMPROVEMENTS OF MY INVENTION

I have provided a clutch and brake system for a gear arrangement of the kind shown in the '328 patent. I have eliminated two friction members and an overrunning clutch and have replaced them with the simplified, single clutch and brake construction of my invention.

The clutch and brake construction of my invention comprises a one way, overrunning clutch that is activated by clutch springs and deactivated as a friction coupling associated with it becomes applied. The overrunning clutch includes clutch elements arranged within a controllable cage. When the friction coupling is energized by a fluid pressure operated servo, the outer race for the overrunning clutch becomes anchored to the transmission housing, thereby establishing a torque reaction point for the planetary gear system, which conditions the gear system for fourth ratio or overdrive operation.

The outer race is comprised of a splined portion that carries friction discs of one part of a bipartite friction disc assembly. Friction discs of a second part of the friction disc assembly are carried by a splined portion of a cage assembly for the clutch elements. Friction torque acting on the second portion of the disc assembly creates a torque on the cage assembly. This causes the cage assembly to be shifted to an overrunning clutch disengaging position. Thus, when the friction disc assembly becomes fully applied, the overrunning clutch is deactivated, thereby eliminating necessity for synchronously controlling the engagement and release of friction members in the transmission control system.

The deactivation of the overrunning clutch occurs as one outer race portion for the clutch is shifted angularly with respect to its companion outer race portion whereby the races are indexed, one with respect to the other, causing disengagement of the clutch elements from their associated clutch ramps on the outer race. The friction coupling thus acts as a brake as well as an activator for shifting the separate outer race portions of the overrunning clutch, one with respect to the other.

This deactivation relies upon the speed difference of the transmission components associated with the planetary gearing to pull the clutch elements away from the cam surfaces of the outer race. In a preferred embodiment of the invention, the clutch elements are clutch rollers.

BRIEF DESCRIPTION OF THE FIGURES OF THE DRAWING

FIG. 3 is a cross-sectional view of a portion of a transaxle of the kind shown schematically in the prior art representation of FIG. 1, but which is adapted to incorporate the improvements of my invention.

FIG. 9 is a schematic representation of the transaxle shown in part in FIG. 3.

PARTICULAR DESCRIPTION OF THE INVENTION

The prior art transaxle illustrated schematically in FIG. 1 will be described because that transaxle provides an overall structural environment for my invention, which will be described with reference to FIGS. 3–10. A gearing arrangement of the kind shown in FIG. 1 can be found in U.S. Pat. Nos. 4,978,328 and 4,509,389, both of which are assigned to the assignee of my invention.

Figure 1:
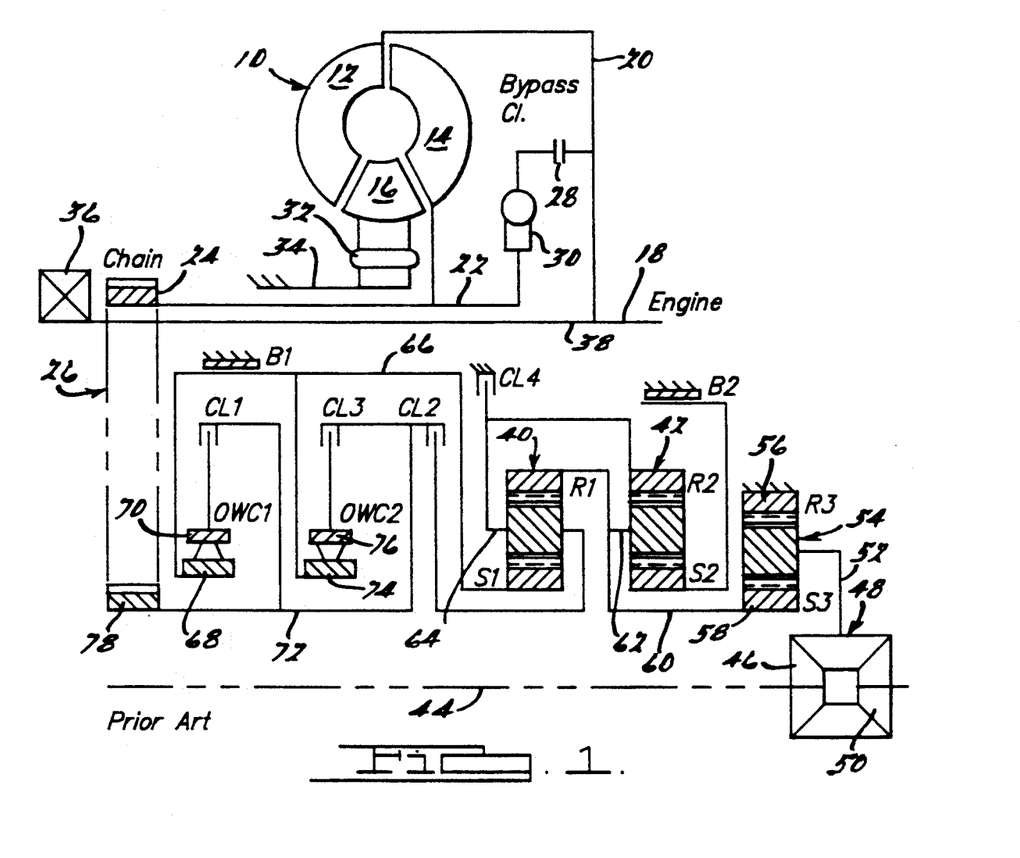
FIG. 1 is a schematic representation of a transaxle gear system known in the prior art.

In FIG. 1, numeral 10 designates a hydrokinetic torque converter having a bladed impeller 12, a bladed turbine 14 and a bladed stator 16 arranged in a toroidal fluid flow circuit. Engine crankshaft torque from torque input shaft 18 is delivered to the impeller 12 through impeller shell 20.

Turbine 14 is connected to turbine shaft 22, which is drivably connected to a drive sprocket 24 for a torque transfer chain drive generally indicated at 26.

A torque converter bypass clutch 28, which includes a damper 30, is adapted to connect the engine crankshaft directly to the turbine shaft 22. This bypasses the torque converter 10 whenever clutch 28 is engaged. The hydrokinetic torque reaction of the torque converter 10 is distributed from the bladed stator through an overrunning coupling 32 to a stator sleeve shaft 34.

A transmission pump 36 is connected drivably to the engine crankshaft through a pump drive shaft 38 extending through the torque converter and through the turbine shaft 22, which is a sleeve shaft surrounding the axis of the crankshaft.

The transaxle includes a pair of simple planetary gear units 40 and 42 that are mounted about the axis of torque output shaft 44, which is connected drivably to vehicle traction wheels, not shown. One end of the output shaft 44 is connected to a side gear 46 of a torque output differential gear unit 48. Another side gear 50 of differential gear unit 48 is connected to a companion axle shaft for another vehicle traction wheel.

A differential carrier 52 carries differential pinions that engage the side gears 46 and 50. It is connected also to the carrier of a final drive planetary gear unit 54, which comprises a stationary ring gear 56, a sun gear 58 and planet pinions engaging the gears 56 and 58. These are rotatably mounted on the planetary carrier.

Sun gear 58 is connected to torque output shaft 60, which in turn is connected to carrier 62 of planetary gear unit 42 and to sun gear R1 of planetary gear unit 40.

Gear unit 42 includes, in addition to the carrier 62 and the ring gear R2, a sun gear S2 which is adapted to be selectively anchored by low-speed and intermediate-speed brake B2.

The carrier 64 for gear unit 40 is adapted to be anchored by reverse brake CL4 during reverse drive operation.

The sun gear S1 for gear unit 40 is connected to clutch drum 66, which in turn is connected drivably to inner race 68 of a first overrunning coupling OWC1. The outer race 70 for the overrunning coupling OWC1 is adapted to be connected selectively to torque input shaft 72 by forward friction clutch CL1.

Clutch drum 66 is connected also to inner race 74 of a second overrunning coupling OWC2. The outer race 76 of the overrunning coupling OWC2 is adapted to be connected selectively to torque input shaft 72 by direct drive friction clutch CL3. Intermediate drive friction clutch CL2 is adapted to connect selectively the torque input shaft 72 to the carrier 64.

The torque input shaft 72 receives its input torque from sprocket 78, which is the driven portion of torque transfer chain drive 26.

Figure 2:
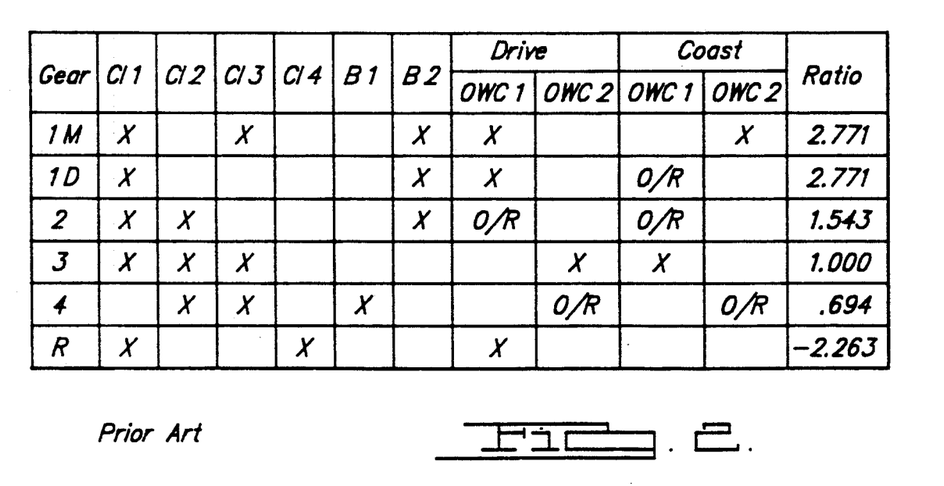
FIG. 2 is a chart that shows the clutch and brake engagement and release pattern for the clutches and brakes of the transaxle shown in FIG. 1.

As seen from the table of FIG. 2, low speed manual drive is obtained by engaging clutches CL1, CL3 and brake B2. With clutch CL1 applied, input torque is delivered from shaft 72, through clutch CL1 and through the overrunning couplings OWC1 to the sun gear S1. Planetary gear unit 40 multiplies the input torque and distributes it to the carrier 62 of gear unit 42. With the sun gear S2 acting as a reaction member and with sun gear S1 acting as a torque input member, the lowest torque ratio is achieved as both gear units establish torque multiplication.

The second ratio is achieved by applying clutch CL2, thus causing the carrier 64 to act as a torque input element as torque is delivered directly to the ring gear R2. Overrunning coupling OWC1 freewheels, thus removing gear unit 40 from the torque delivery path. Clutch CL1 may remain applied.

A ratio change from the second ratio to the third ratio, which is a direct drive ratio, is obtained by engaging clutch CL3 while clutches CL1 and CL2 are applied simultaneously. Brake B2 is released. Thus, all of the elements of the two gear units 40 and 42 are locked together for rotation in unison as torque is delivered directly from torque input shaft 72 to torque output shaft 60.

The fourth drive ratio, which is an overdrive ratio, is obtained by releasing clutch CL1 and applying brake B1. Brake B1 surrounds clutch drum 66. When brake B1 is applied, it anchors sun gear S1. Thus, the sun gear acts as a reaction element as the ring gear R1 is overdriven. Gear member 42 is removed from the torque path because brake B2, which anchors sun gear S2, is released during fourth ratio operation as well as during direct drive operation.

Reverse drive is obtained by applying brake CL4 and clutch CL1. Thus, torque from the input shaft 72 is delivered through the overrunning coupling OWC1 to the sun gear S1. With the carrier 64 acting as a reaction point, ring gear R1 is driven in a reverse direction, which drives the output shaft 60 in a reverse direction.

During coasting, overrunning coupling OWC2 is engaged if the transmission is conditioned for low ratio operation. Thus, coasting torque is delivered through the engaged overrunning coupling OWC2 and the clutch CL3 through the input shaft 72. Coupling OWC1 also is engaged as torque from the sun gear S1 during coasting operation is delivered to the clutch drum 66, through the coupling OWC1, and through the engaged clutch CL1 to the input shaft 72.

During coasting operation in the second ratio, torque is transferred from the carrier 64 and through the engaged clutch CL2 to the input shaft 72. Both of the overrunning couplings OWC1 and OWC2 are inactive at that time. During coasting operation in the third ratio, overrunning coupling OWC1 is adapted for torque delivery as torque from the sun gear S1 is delivered through it and through the engaged clutch CL1 to the input shaft 72.

During coasting operation in the fourth ratio, torque is transferred through the carrier 64 from the shaft 60. With the sun gear S1 acting as a reaction member and with brake B1 applied, torque is transferred from carrier 64 and through the engaged clutch CL2 to the input shaft 72

The improvements of my invention make it possible to eliminate the necessity for having separate friction members corresponding to brake B1 and clutch CL1 in combination with an overrunning coupling. This greatly reduces the space required for the clutch and brake control elements and simplifies the control system that controls the engagement and release of synchronous clutches and brakes. For the purpose of describing the mode of operation, reference now will be made to the embodiment of the invention shown in FIG. 3.

For the purpose of correlating the clutch and brake structures of FIGS. 3 and 1, reference numerals in FIG. 3 and in FIG. 1 are common in those instances in which they identify corresponding structural elements. The input shaft 72 shown in FIG. 1, for example, carries the designator 72 in FIG. 3. That shaft is splined at 80 to clutch sleeve shaft 82 as shown in FIG. 3. The sleeve shaft is connected to inner race 84 by spline 86. It is connected also to clutch cylinder member 88, which carries clutch discs 90 of the clutch CL2. Clutch element 92 carries clutch discs for the clutch CL2 which are interleaved with the discs 90. Clutch element 92 is connected to carrier 64 as explained with reference to FIG. 1.

Clutch cylinder 88 is secured at 94 to clutch element 96 which carries friction discs 98 for clutch CL3.

An outer race for overrunning coupling OWC2 carries friction discs that are interleaved with respect to discs 98. This outer race is shown at FIG. 3 at 100. The inner race 102 for the coupling OWC2 is connected to clutch drum 66 by means of radially extending clutch member 104.

Cylinder member 88 defines a first annular cylinder which receives clutch piston 106. Piston 106 is adapted to apply a clutch engaging force to the friction discs of clutch CL3 when its annular cylinder is pressurized. Similarly, clutch cylinder member 88 defines a second annular cylinder which receives annular piston 108. Piston 108 is adapted to apply a clutch engaging force to the friction discs of clutch CL2 when its annular cylinder is pressurized. Reaction springs 110 and 112 provide piston return forces for the pistons 106 and 108.

Figure 7:
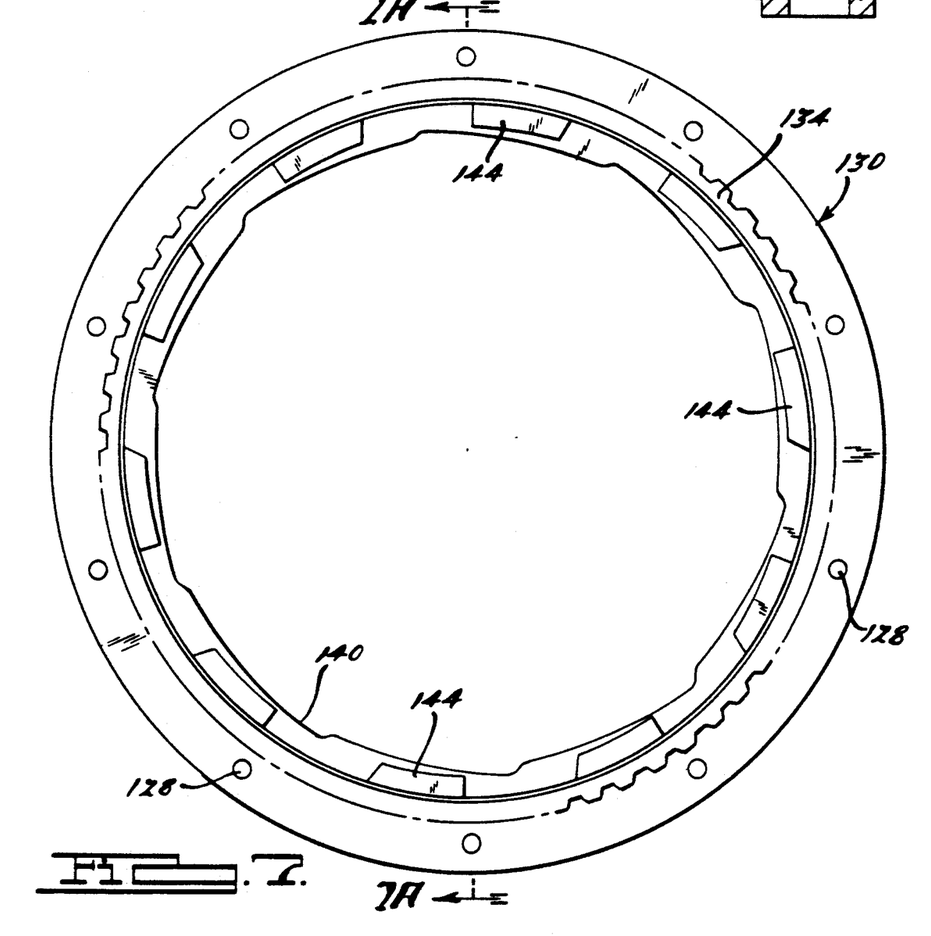
FIG. 7 is a side elevation view of the outer race of the overrunning clutch of the assembly of FIG. 3.
Figures 7A, 8:
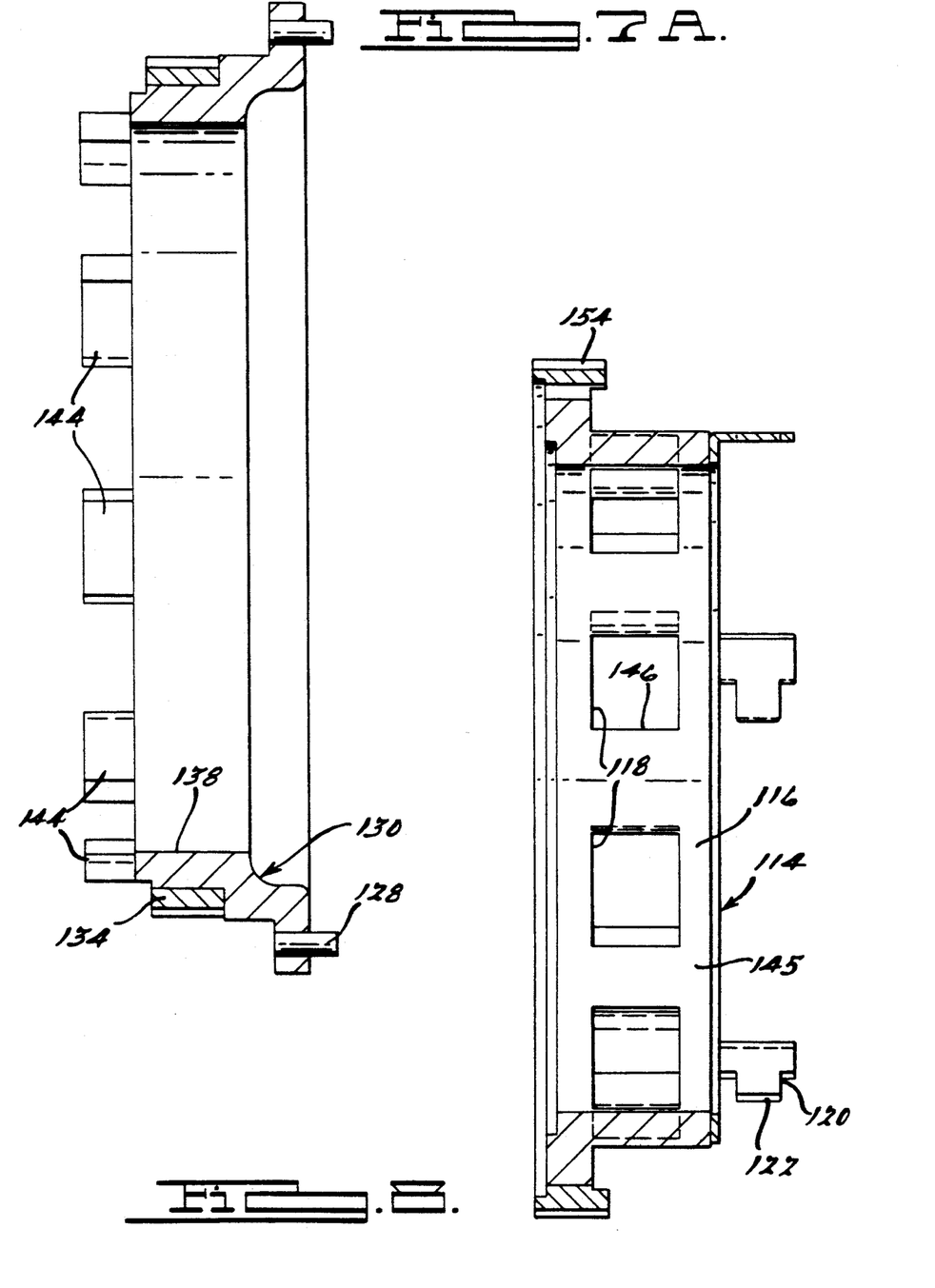
FIG. 7A is a cross-sectional view taken along the section line 7A—7A of FIG. 7.
FIG. 8 is a cross-sectional view taken along a diametrical plane showing the cage assembly for the overrunning clutch of FIG. 3.

A roller cage assembly 114 is shown in FIG. 8 as well as in FIG. 3. It includes an annular portion 116 which has roller openings 118. It is provided with extensions 120 on one side thereof, as indicated in FIG. 8. These extensions have projections 122 adapted to be received in one end of compression springs (not shown) in FIG. 8. The springs that act on the cage are illustrated in FIG. 3 at 124. The opposite ends of the springs 124 engage a spring retainer element 126 which is secured by pins 128 to the outer race 130 of an overrunning coupling identified generally in FIG. 3 by reference numeral 132.

The outer race 130 is shown in greater detail in FIGS. 7 and 7A. It includes an outer spline portion 134, which is connected drivably to internally splined clutch disc 136, as shown in FIG. 3. The inner surface 138 of the outer race 130 is provided with cam surfaces as best seen in FIG. 7. The cam surfaces are designated in FIG. 7 by reference numeral 140. Each of them defines a ramp extending in a common direction. Those ramps are adapted to be engaged by clutch roller elements 142 shown in FIG. 3.

The race 130 at its left side, as viewed in FIG. 7A, is provided with a plurality of angularly spaced axial projections 144. The spacing between the projections 144 can be seen by referring to FIG. 8 as well as FIG. 7A. One projection is associated with each of the ramps defined by the cam surfaces 140.

Figure 4:
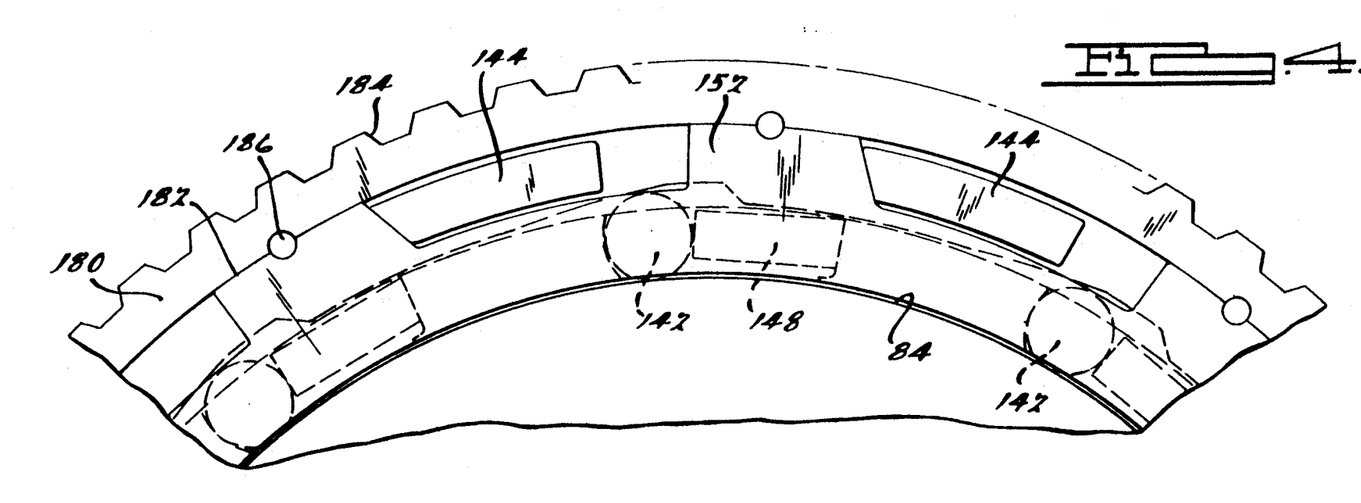
FIG. 4 is a view showing the relationship between the clutch roller elements for the overrunning clutch of my invention, as shown in FIG. 3, and the relationship between the cammed outer race and the cylindrical inner race when the roller elements are in a freewheeling condition.
Figure 5:
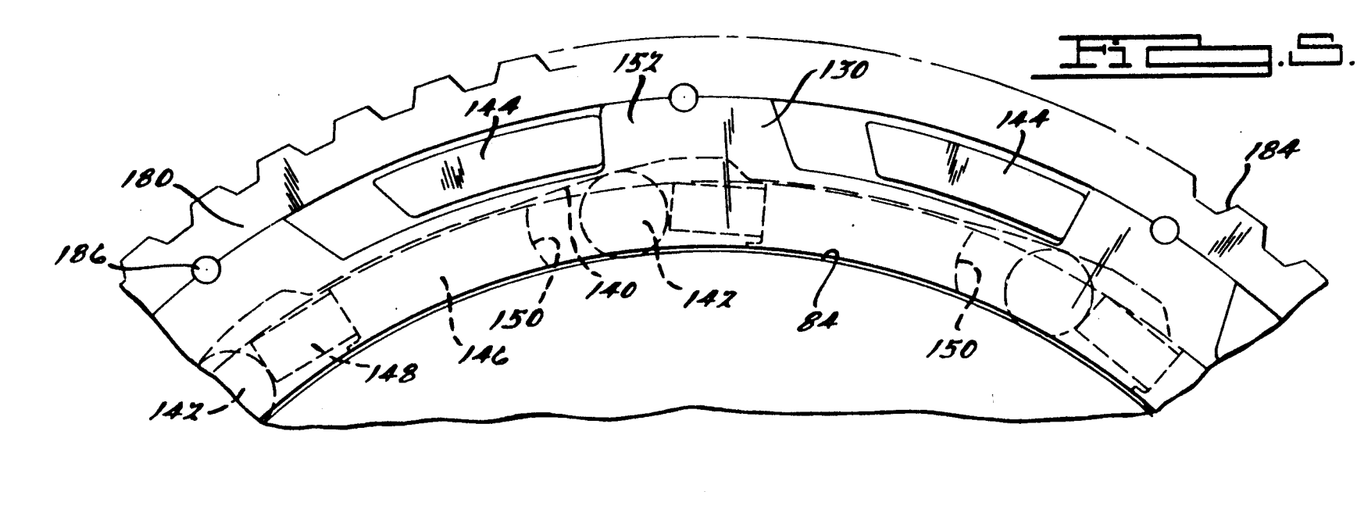
FIG. 5 is a view similar to FIG. 4, but the rollers are shown in their torque transmitting position.

A cage ring 145, as seen in FIG. 3, surrounds the inner race 84. It is provided with cross members 146 which extend axially between roller elements 142. One cross member 146 is situated adjacent each roller. This is seen best in FIGS. 4 and 5. One side of each projection 146 acts as a reaction shoulder for a roller bias spring, as best seen in FIG. 5. The springs in FIG. 5 are shown at 148. The springs, which may be convoluted leaf springs, are adapted to normally urge the rollers into camming engagement with the cam surfaces 140 of the outer race 130.

As seen in FIG. 5, there is a clearance between each projection 146, as seen at 150, and the adjacent roller 142 when the rollers are engaged with the cam surfaces. When the ring 145 is shifted in a clockwise direction as viewed in FIG. 5, relative to the race 130, the ends 150 of the projections 146 will engage the rollers as seen in the roller off-cam view illustrated in FIG. 4. The rollers thus disengage the cam surfaces, and the clutch is rendered inactive.

Figures 6, 6A:
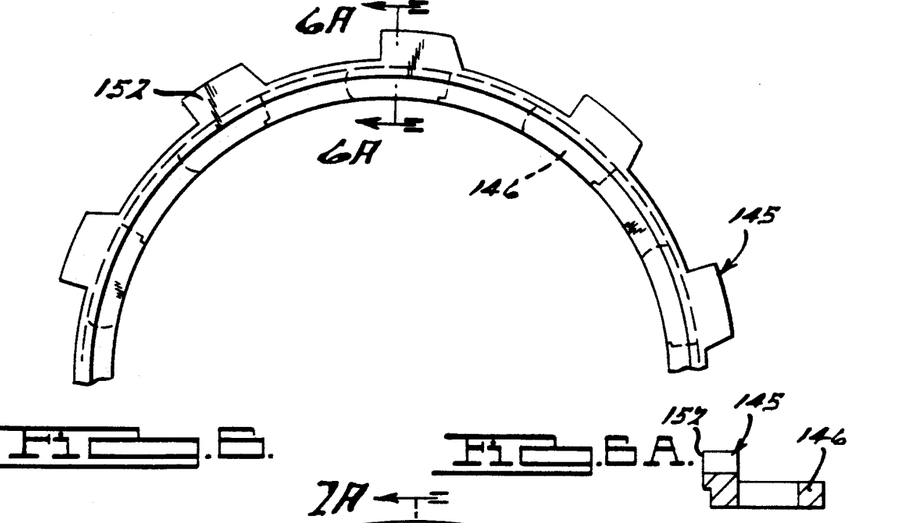
FIG. 6 is a side elevation view of a cage for the roller elements that contact the portion of the outer race on which cam surfaces are formed.
FIG. 6A is a cross-sectional view taken along the plane of section line 6A—6A of FIG. 6

It is thus apparent that the cage ring 145 ma move angularly with respect to the race 130. The limits of the angular relative motion between the cage ring 145 and the race 130 is established by radial projections 152, as seen in FIG. 6, which are received in the spaces provided by the projections 144 on the race illustrated in FIGS. 7 and 7A. As seen in FIG. 4, when the overrunning coupling 132 is in a roller-off cam condition, a space is provided between projections 144 on the race 130 and the adjacent radial projections 152 on the cage ring. On the other hand, when the overrunning coupling 132 is in a roller-on cam condition, as shown in FIG. 5, the projections 152 directly engage the projections 144. The spaces between the projections 144 and 142 thus define the limits of the angular lost motion between the cage ring 145 and the race 130.

The cage assembly 114 is provided with external splines 154 which carry an internally splined friction disc 156. This disc 156 and an adjacent disc are interleaved with respect to discs 158 carried by cylinder member 160.

The disc 156, the disc 158 and the disc 136 cooperate to define a controller clutch disc assembly generally identified by reference numeral 162.

Clutch cylinder member 160 defines an annular cylinder 164. A piston is disposed in the cylinder 164 as shown at 166. The pressure chamber defined by the cylinder 164 and the piston 166 receives pressure fluid, thus establishing a clutch engaging force that is transmitted to the clutch disc assembly 162. A return spring 168 opposes the force of the fluid pressure.

The clutch housing 160 is held in a stationary condition by lugs 170 that are received in openings 172 formed in transverse support wall 174 of the transmission housing. This wall in turn supports stationary mounting shaft 176 disposed within the sleeve shaft 82.

As explained with reference to the schematic diagram of FIGS. 1 and 2, it is necessary with gearing arrangements of this kind to apply a reaction brake to the sun gear S1 during overdrive operation. It is necessary also for the clutch CL1 of FIG. 1 to be released at the instant of a ratio change from a third ratio to the fourth ratio. If the clutch CL1 were not released, the transmission would be locked up when the band B1 is applied because the race 68 would tend to rotate in a reverse direction.

The clutch assembly of the present invention illustrated in FIG. 3 permits torque to be delivered through the overrunning coupling 132 during operation in the first forward driving speed ratio. The overrunning coupling 132 overruns during operation in the second forward driving ratio. During coasting in the third ratio, coupling 132 delivers coast torque.

During operation in the first forward driving ratio, torque is delivered directly from the input shaft 72, through the spine connection 80 and through the sleeve shaft 82 to the inner race 84. With the overrunning clutch 132 in a locked condition, driving torque is transferred through it to the race 130 and to the torque input element of the gearing. On the other hand, when a ratio change occurs from the third ratio to the fourth ratio, the multiple friction disc assembly 162 becomes applied at the initiation of that ratio change. Friction disc 156 and the adjacent disc that is splined to cage ring 145 will initially deliver torque that exceeds the torque that would be transmitted by friction disc 136 to the race 130. Thus, the ring 145 will tend initially to shift angularly with respect to the race 130, causing the rollers to assume the roller-off cam position shown in FIG. 5. This disengages the rollers 142 and deactivates the overrunning coupling 132. Continued application of pressure to the friction discs of the disc assembly 162 will cause the race 130 to become anchored to the housing, thus establishing a reaction point as the sun gear S1 becomes anchored.

The fully engaged condition at which the sun gear S1 becomes anchored occurs only after the clutch rollers have been shifted to the roller-off cam position illustrated in FIG. 5. Thus, it is not possible to brake the sun gear S1 without simultaneously disengaging the overrunning coupling 132. This avoids a torque tie-up condition, and a ratio change from the third ratio to the fourth ratio is achieved without the necessity for using an extra friction clutch corresponding to clutch CL1 of FIG. 1. Furthermore, the use of a simple friction disc coupling OD/CL makes it unnecessary to use a space-consuming brake band and fluid pressure operated brake servo.

It should be noted that the friction disc 136 and the race 130 to which it is connected form a part of a relatively large rotary inertia mass, since those elements are connected to the torque input elements of the gearing. On the other hand, at the initiation of a shift from the third ratio to the fourth ratio, the rotary mass to which the clutch disc 156 and the adjacent clutch disc for the ring 145 are connected is relatively small. This substantial difference in the rotary inertia masses as well as the added clutching capacity of the multiple friction discs connected to the ring 145 relative to the clutching capacity of the disc connected to the race 130 contribute to the ability of the ring 145 to shift angularly with respect to the race 130 at the initiation of a shift to the fourth ratio.

When the transmission is shifted from fourth ratio to third ratio, the reverse procedure occurs. Thus, the brake is released as the clutch rollers for the overrunning clutch 132 again assume a roller-on cam position as the friction disc connected to the ring 145 shifts relative to the friction disc connected to the race 130.

I have shown in FIG. 9 a schematic representation of the structure shown in FIG. 3. By comparing the schematic diagram of FIG. 9 with the schematic diagram of FIG. 1, the simplicity of a transaxle embodying the improvements of my invention are apparent because there is no counterpart in the design shown in FIG. 9 for the clutch CL1 of FIG. 1, and there is no counterpart for the brake B1 of FIG. 1.

The elements in FIG. 9 that have counterpart elements in the FIG. 1 construction have been designated by similar reference characters, although prime notations are added.

As seen in FIGS. 3, 4 and 5, the cage ring 145 includes a splined sleeve ring 180 which is pressed on the outer surfaces 182 of the projections 152 formed on the ring 144. The spline teeth 184 on the ring 180 register with internal splines formed on the friction disc 156. Torque transmitting pins 186 can be used if desired to avoid shifting movement of the spline ring 184 with respect to the ring 144.

The ring construction that is illustrated in FIGS. 6 and 6B is not shown with the spline ring 180 assembled. This is done for the purposes of clarity.

Figure 10:
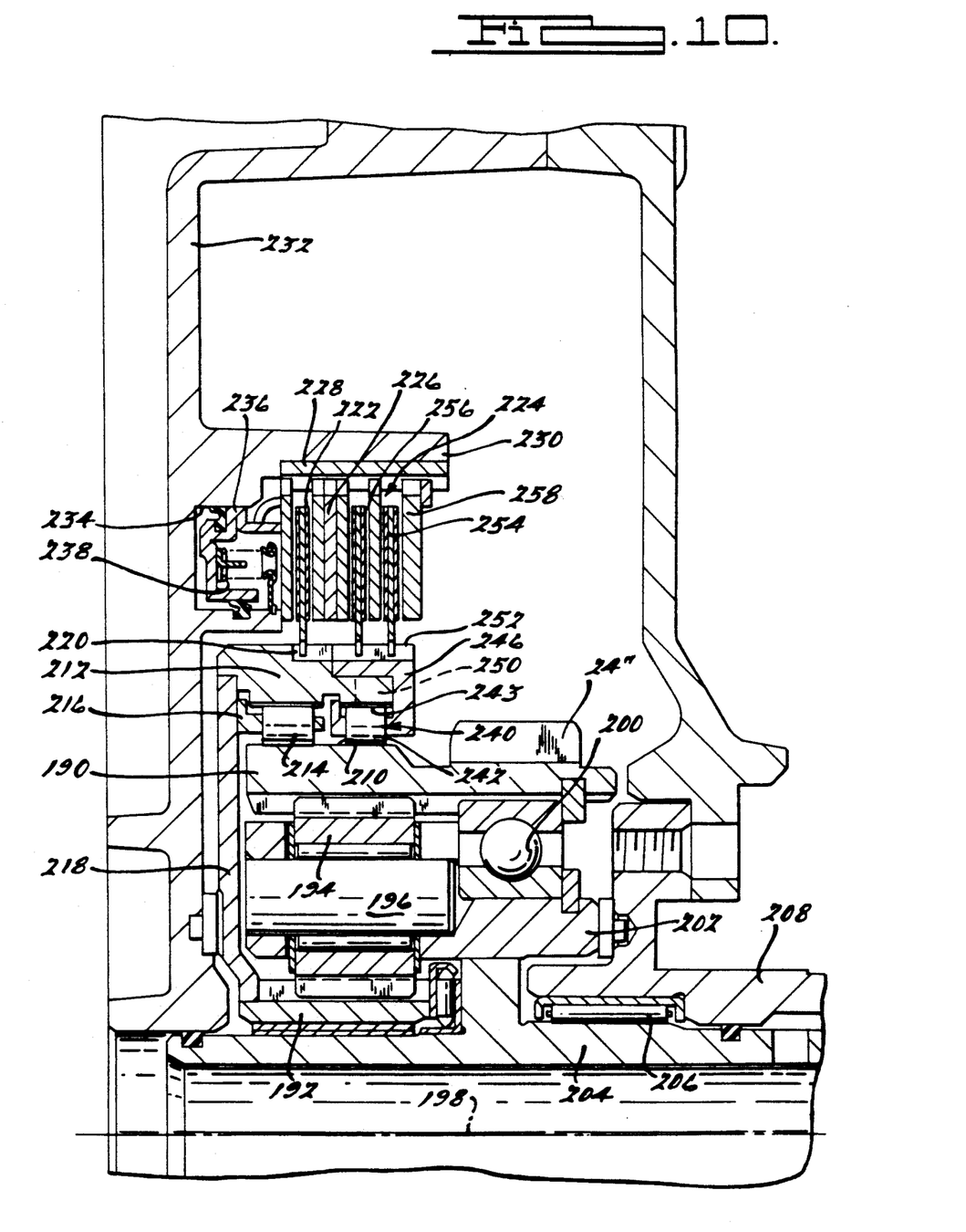
FIG. 10 is a modification of the transaxle shown in FIG. 9 wherein gearing is provided on the axis of the engine and wherein a clutch assembly embodying the features of my invention is employed to effect two-speed ratios in the torque transfer drive between the gearing on the engine axis and the gearing on the output shaft axis.

FIG. 10 shows an adaptation of the clutch and brake structure of my invention for use in a five-speed version of the construction shown in FIG. 9. In this instance, a clutch and brake arrangement can be assembled on the axis of the turbine shaft illustrated in FIG. 10 at 204. This shaft corresponds to the shaft 22 of FIG. 1.

A drive sprocket shown at 24" in FIG. 10 corresponds to the drive sprocket 24 in FIG. 1. Unlike the embodiment of FIG. 1, there is no direct connection between the sprocket 24" and the turbine shaft. Instead, there is a two-speed planetary drive that drivably connects shaft 204 and the sprocket 24". During operation in the lowest drive ratio for the transaxle, the planetary drive shown in FIG. 10 is in a torque reduction condition. Upon a ratio change from the first ratio to the second ratio, provision is made in the drive shown in FIG. 10 to effect a one-to-one torque ratio as torque is delivered from the turbine shaft 204 to the sprocket 24".

The gearing of the drive shown in FIG. 10 includes a ring gear 190, a sun gear 192 and planetary pinions 194. A carrier 196 rotatably supports the pinions 194. The pinions, which are equally spaced about the axis 198 of the turbine shaft, engage ring gear 190 and sun gear 192. Ring gear 190 is formed integrally with the sprocket 24". Bearing 200 rotatably supports ring gear 190 and sprocket 24" on support ring 202 which, in turn, is connected to turbine shaft 204. Shaft 204 is journalled by bearing 206 in stationary stator sleeve shaft 208.

The ring gear 190 has an overrunning clutch race 210 formed on its outer periphery. A cammed outer race 212 surrounds the race 210. A series of clutch rollers 214 is received between the races 210 and 212, the latter being cammed to provide a plurality of cam surfaces such as the cam surfaces 140 of the clutch described with reference to FIG. 5. Clutch rollers 214 are positioned in a roller cage 216 so that they are held in angularly spaced relationship with one roller engaging each of the cam surfaces of the outer race.

The outer race 212 is connected directly to sun gear 192 by a clutch member 218.

The outer race 212 is provided with external splines 220 which register with internal splines formed on friction brake discs 222 which form a part of a multiple disc brake assembly 224. Separator plates 226 for the brake 224 have external splines which engage the splines 228 formed on stationary brake member 230, which is connected directly to or formed integrally with transaxle housing 232.

The brake 224 comprises an annular cylinder 234 formed in the housing 232. This cylinder receives annular piston 236. A series of piston return springs 238 acts on the piston 236 to normally retract the piston away from the friction disks of the brake 224.

A coast clutch is identified generally by reference character 240. This clutch comprises clutch rollers 242 situated between the outer race 210 for the sun gear 190. Cam surfaces 243 are formed on the outer race 212. The cam surfaces 243 are formed in the opposite sense with respect to the cam surfaces for the rollers 214. Thus, the clutch rollers 240 are capable of delivering coast torque from the sprocket 24" to the sun gear 192 when the transaxle is conditioned for low torque ratio operation.

A cage 246 surrounds a race 190. It positions the rollers 242 in angularly spaced disposition about the axis of the turbine shaft.

The cage 246 is provided with axially extending projections 250 which correspond to the projections 144 on the cage described with reference to FIG. 4. These projections register with recesses formed on the race 212. The recesses are wider than projections so that a limited degree of rotary lost motion of the cage 246 relative to the race 212 is permitted.

The cage is provided with external splines 252 which register with internal splines formed on friction discs 254. A separator plate 256 is carried by the brake member 230. A reaction ring 258 is held in place by a snap ring as indicated to provide a reaction force for the brake-apply pressure.

In the embodiment shown in FIG. 10, there are two friction discs 254 carried by the cage for the rollers 242. There is a single friction disc 222 carried by the outer race 212.

When the transaxle is conditioned for the lowest speed ratio, the gear unit shown in FIG. 10 acts with a one-to-one speed ratio since turbine torque is delivered through the turbine shaft 204 to the carrier 196. Torque is transferred through the overrunning clutch 214 to the sprocket 24" in this instance.

Coasting torque can be delivered from the sprocket 24" to the race 212 through the overrunning clutch elements 242.

To effect a ratio change from the first ratio to the second ratio, the clutch and brake elements of the main planetary gearing shown in FIG. 9 remain in the condition they assume during low-speed ratio operation. However, multiple disc brake assembly 224 is applied to provide a reaction point for the torque reaction of the planetary gear unit shown in FIG. 10. When the multiple disc brake assembly is actuated upon introduction of control pressure to the annular cylinder 234, sun gear 192 becomes braked, thereby providing a torque reaction. This causes an over-speeding of the ring gear 190 and the sprocket 24". When this occurs, the overrunning clutch 214 freewheels. As mentioned previously, however, the overrunning clutch used for coast, brake purposes is arranged with its cam surfaces 243 in the opposite sense with respect to the cam surfaces of the overrunning clutch 214. Thus, it is necessary during a ratio change to deactivate the overrunning clutch 214. This is accomplished in a manner similar to the manner in which the overrunning clutch element 132 shown in FIG. 3 is deactivated.

Initially, upon application of the brake, torque will be applied to the clutch race because the two clutch plates connected to the cage have a torque capacity greater than the capacity of the single clutch plate connected to the overrunning clutch race 212. Thus, at the initiation of a braking action by the multiple disk brake assembly, a differential torque will be applied to the race 212 and to the cage 246. This causes the cage 246 to shift angularly with respect to the race 212 in a manner similar to the shifting movement of the clutch of FIG. 3. The clutch rollers 242 will assume then a roller-off cam position similar to the roller-off cam position illustrated in FIG. 4. Thus, there is no tie-up or simultaneous engagement of the friction brake with the braking action of the roller elements 242. The same friction brake then can be used for providing a reaction point for the gear unit of FIG. 10 and for releasing the releasable overrunning clutch elements 242. This simplifies the assembly and eliminates the need for an additional friction member. Further, it requires a minimum of space in the overall transaxle assembly.

After the gear unit shown in FIG. 10 assumes its overdrive condition, the transaxle will have assumed its second ratio condition. Further ratio changes can then be accomplished in the manner previously described as the clutches and brakes of the main transaxle gearing shown in FIG. 3 are actuated and released in accordance with the previously described clutch and brake engagement and release pattern. Thus, there are five ratios available in the overall torque ratio spread for the transaxle modification described with reference to FIG. 10.

Having described preferred embodiments of my invention what I claim and desire to secure by U.S. Letters Patent is:

1. A planetary gear system for transferring torque from a driving member to a driven member comprising:
 a sun gear element, a ring gear element, a carrier element and planet pinions on said carrier element engaging said sun gear element and said ring gear element;
 a releasable overrunning coupling having an outer race, an inner race and clutch elements disposed between said races, said clutch element being adapted to transmit torque between said races in one direction;
 said coupling defining a torque flow path from said driving member to one of said elements of said gear system;
 friction torque establishing brake means for anchoring one race of said overrunning coupling whereby a torque reaction point for said gear system is established; and
 means responsive directly to establishment of friction torque upon application of said brake means for adjusting the angular position of said clutch elements to disable said overrunning coupling upon application of said brake means.

2. The combination as set forth in claim 1 wherein said overrunning coupling comprising a circular cage assembly disposed between said races, said clutch elements being disposed on said cage assembly and positioned by said cage assembly between said races in angularly spaced relationship, one with respect to the other;
said means for adjusting said clutch elements comprising a connection between said brake means and said cage assembly whereby said cage assembly is adjusted angularly upon application of said brake means.

3. A geared transmission for transferring torque from a driving member to a driven member comprising:
a gear assembly comprising a torque input element, a torque output element and a reaction element;
a releasable overrunning coupling having an outer race, an inner race and clutch elements disposed between said races, said clutch elements being adapted to transmit torque between said races in one direction;
said coupling defining a torque flow path from said driving member to one of said elements of said gear member, whereby one torque ratio for said transmission is established;
a friction torque establishing brake means for anchoring one race of said overrunning coupling whereby a torque reaction point for said gear assembly is established as another torque ratio for said transmission is established; and
means responsive directly to establishment of friction torque upon application of said brake means for adjusting the angular position of said clutch elements to disable said overrunning coupling upon application of said brake means.

4. A planetary gear system for transferring torque from a driving member to a driven member comprising:
a sun gear element, a ring gear element, a carrier element and planet pinions on said carrier element engaging said sun and ring gear elements;
a releasable overrunning coupling having a first race with cam surfaces formed thereon and a second race concentrically disposed with respect to said first race, roller elements between said races, said roller elements being adapted to engage said cam surfaces to establish a one-way torque flow path between said races, said overrunning coupling having one race connected to said driving member, the other race of said overrunning coupling being connected to one of said elements of said gear system when said gear system is conditioned for operation in a first gear ratio;
friction torque establishing brake means for anchoring said one gear system element when said gear system is conditioned for operation in a second gear ratio; and
means for disabling said overrunning coupling in direct response to establishing of friction torque upon application of said brake means.

5. The combination as set forth in claim 4 wherein said overrunning coupling comprises a circular cage assembly disposed between said races, said roller elements being disposed in said cage assembly and positioned by said cage assembly between said races in angularly spaced relationship, one with respect to the other;
said disabling means comprising a connection between said brake means and said cage assembly whereby the latter is angularly adjusted to shift said roller elements out of engagement with said cam surfaces when said brake means is actuated.

6. A geared transmission for transferring torque from a driving member to a driven member comprising:
a gear assembly having a torque input element, a torque output element and a reaction element;
a releasable overrunning coupling having an outer race, an inner race and clutch elements disposed between said races, a first of said races having cam surfaces formed thereon, a second race concentrically disposed with respect to said first race, roller elements between said races, said roller elements being adapted to engage said cam surfaces to establish a one-way torque flow path between said races, one of said races being connected drivably to said driving member, the other race being connected to one of said elements of said gear assembly when said gear assembly is conditioned for operation in a first gear ratio;
brake means for anchoring said one gear assembly element when said transmission is conditioned for operation in a second gear ratio; and
means for disabling said overrunning coupling in direct response to establishment of friction torque upon application of said brake means.

7. A planetary gear system for transferring torque from a driving member to a driven member comprising:
a sun gear element, a ring gear element, a carrier element and planet pinions in said carrier engaging said sun gear element and said ring gear element;
a releasable overrunning coupling having an outer race, an inner race and clutch elements disposed between said races, said clutch elements being adapted to transmit torque between said races in one direction;
said coupling defining a torque flow path from said driving member to one of said elements of said gear system;
brake means for anchoring one race of said overrunning coupling whereby a torque reaction point for said gear system is established; and
means responsive to application of said brake means for adjusting the angular position of said clutch elements to disable said overrunning coupling upon application of said brake means;
wherein said overrunning coupling comprises a circular cage assembly disposed between said races, said clutch elements being disposed in said cage assembly and positioned by said cage assembly between said races in angularly spaced relationship, one with respect to the other;
said clutch element adjusting means comprising a connection between said brake means and said cage assembly whereby said cage assembly is adjusted angularly upon application of said brake means;
said brake means comprises a first friction brake disc carried by said outer race and a second friction disk carried by said cage assembly, said friction disks forming in part a multiple disk brake assembly, said first and second disks being relatively angularly adjustable upon initial application of said brake means whereby said overrunning coupling is disabled as said brake means becomes applied.

8. A planetary gear system for transferring torque from a driving member to a driven member comprising:

a sun gear element, a ring gear element, a carrier element and planet pinions on said carrier element engaging said sun and ring gear elements;

a releasable overrunning coupling having a first race with cam surfaces formed thereon and a second race concentrically disposed with respect to said first race, roller elements between said races, said roller elements being adapted to engage said cam surfaces to establish a one-way torque flow path between said races, said overrunning coupling having one race connected to said driving member, the other race of said overrunning coupling being connected to one of said elements of said gear system when said gear system is conditioned for operation in a first gear ratio;

brake means for anchoring said one gear system element when said gear system is conditioned for operation in a second gear ratio; and means for disabling said overrunning coupling in response to application of said brake means;

wherein said overrunning coupling comprises a circular cage assembly disposed between said races, said roller elements being disposed in said cage assembly and positioned by said cage assembly between said races in angularly spaced relationship, one with respect to the other;

said disabling means comprising a connection between said brake means and said cage assembly whereby the latter is angularly adjusted to shift said roller element out of engagement with said cam surfaces when said brake means is actuated;

wherein said brake means comprises a first friction disc carried by said outer race and a second friction disc carried by said cage, said friction discs forming in part a multiple disc brake assembly, said first and second discs being relatively angularly adjustable upon initial application of said brake means whereby said overrunning coupling is disabled as said brake means becomes applied.

* * * * *

UNITED STATES PATENT AND TRADEMARK OFFICE
CERTIFICATE OF CORRECTION

PATENT NO. : 5,234,389
DATED : August 10, 1993
INVENTOR(S) : Eldon L. Goates

It is certified that error appears in the above-indentified patent and that said Letters Patent is hereby corrected as shown below:

Column 1, lines 1-3 and;
On the title page, Item [54]: Title should read —POWER TRANSMISSION MECHANISM HAVING A RELEASABLE OVERRUNNING COUPLING ACTING IN COOPERATION WITH A FRICTION BRAKE—.

On the title page, Item [56]: "References Cited", the patentee for U.S. Patent No. 2,683,997 should be —Forster—.

Column 6, line 40, after "145" delete "ma" and substitute —may—.

Column 10, line 4, after "coast" delete the comma (,).
line 24, after "clutch" delete "race" and substitute —cage 246—.

Column 11, line 4, claim 2, after "coupling" delete "comprising" and substitute —comprises—.

Signed and Sealed this

Twenty-ninth Day of March, 1994

Attest:

BRUCE LEHMAN

Attesting Officer        Commissioner of Patents and Trademarks